US010994999B1

(12) United States Patent
Wilshe

(10) Patent No.: US 10,994,999 B1
(45) Date of Patent: May 4, 2021

(54) AGRICULTURAL COMPOSITION FOR FACILITATING TREATMENT OF A PLANT

(71) Applicant: Donald Richard Wilshe, Parrish, FL (US)

(72) Inventor: Donald Richard Wilshe, Parrish, FL (US)

( * ) Notice: Subject to any disclaimer, the term of this patent is extended or adjusted under 35 U.S.C. 154(b) by 0 days.

(21) Appl. No.: 17/115,307

(22) Filed: Dec. 8, 2020

Related U.S. Application Data

(60) Provisional application No. 63/046,018, filed on Jun. 30, 2020, provisional application No. 63/065,193, filed on Aug. 13, 2020, provisional application No. 63/076,598, filed on Sep. 10, 2020.

(51) Int. Cl.
| | |
|---|---|
| *C01B 32/05* | (2017.01) |
| *C05G 3/60* | (2020.01) |
| *C05G 5/27* | (2020.01) |
| *C05G 3/80* | (2020.01) |
| *C05D 9/00* | (2006.01) |
| *B82Y 40/00* | (2011.01) |

(52) U.S. Cl.
CPC ............... *C01B 32/05* (2017.08); *C05D 9/00* (2013.01); *C05G 3/60* (2020.02); *C05G 3/80* (2020.02); *C05G 5/27* (2020.02); *B82Y 40/00* (2013.01)

(58) Field of Classification Search
None
See application file for complete search history.

(56) References Cited

U.S. PATENT DOCUMENTS

| | | | |
|---|---|---|---|
| 3,912,815 A | 10/1975 | Henrick et al. | |
| 4,124,371 A | 11/1978 | Dixon | |
| 6,231,785 B1 * | 5/2001 | Kondo ............... | C09K 19/06 252/299.6 |
| 6,344,193 B1 | 2/2002 | Hammock et al. | |
| 9,795,139 B2 | 10/2017 | Eckelbarger et al. | |
| 10,550,116 B2 | 2/2020 | Fischer et al. | |
| 2010/0272769 A1 | 10/2010 | Darlington et al. | |

OTHER PUBLICATIONS

Wilshe, Physical Chemistry is the next generation of Agriculture Technology, Parrish, Fl, dated Jan. 5, 2021.

* cited by examiner

*Primary Examiner* — Wayne A Langel

(57) ABSTRACT

Disclosed herein is an agricultural composition for facilitating treatment of a plant, in accordance with some embodiments. Accordingly, the agricultural composition may include carbanions and a diluting agent. Further, a carbanion of the carbanions may include a carbon atom. Further, the carbon atom may include a formal charge of −1. Further, the diluting agent may be capable of dissolving the carbanions for forming a solution. Further, the dissolving of the carbanions may include diluting the carbanions. Further, a ratio of the diluting agent to the carbanions by volume ranges from 50:1 to 550:1. Further, the dissolving facilitates at least one application of the solution to the plant.

20 Claims, 11 Drawing Sheets

US 10,994,999 B1

AGRICULTURAL COMPOSITION FOR FACILITATING TREATMENT OF A PLANT

FIELD OF THE INVENTION

Generally, the present disclosure relates to the field of Drug, bio-affecting, and body treating compositions. More specifically, the present disclosure relates to an agricultural composition for facilitating treatment of a plant.

BACKGROUND OF THE INVENTION

Existing compositions for facilitating treatment of a plant are deficient with regard to several aspects. For instance, existing compositions do not remediate soil. Furthermore, current compositions do not increase the electrical conductivity of the soil. Moreover, current compositions do not perform fertilizer recovery. Further, the existing compositions do not kill fungi, bacterial, viruses, and insects present on the plant without harming the plant. Further, the existing compositions do not increase the translocation of nutrients in the plant. Further, the existing compositions do not increase ERGs in the soil. Further, the existing compositions do not increase the chlorophyll content of the plant.

Therefore, there is a need for an agricultural composition for facilitating treatment of a plant that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an agricultural composition for facilitating treatment of a plant, in accordance with some embodiments. Accordingly, the agricultural composition may include carbanions and a diluting agent. Further, a carbanion of the carbanions may include a carbon atom. Further, the carbon atom may include a formal charge of −1. Further, the diluting agent may be capable of dissolving the carbanions for forming a solution. Further, the dissolving of the carbanions may include diluting the carbanions. Further, a ratio of the diluting agent to the carbanions by volume ranges from 50:1 to 550:1. Further, the dissolving facilitates at least one application of the solution to the plant.

Further disclosed herein is a method for producing an agricultural composition to facilitate treatment of a plant, in accordance with some embodiments. Accordingly, the method may include a step of extracting at least one organic material from at least one organic material source. Further, the at least one organic material may include a carbon compound. Further, the method may include a step of blending the at least one organic material with at least one reagent for forming an agricultural composition preform. Further, the method may include a step of applying at least one of a specific temperature and a specific pressure to the agricultural composition preform. Further, the applying initiates a chemical reaction in the agricultural composition preform. Further, the chemical reaction may include at least one of a redox reaction and a reduction reaction. Further, the carbon compound may be reduced to form carbanions based on the at least one of the redox reaction and the reduction reaction. Further, a carbon atom of a carbanion of the carbanions may include a formal charge of −1. Further, the method may include a step of dissolving the carbanions using a diluting agent for forming a solution. Further, the dissolving of the carbanions may include diluting the carbanions. Further, a ratio of the diluting agent to the carbanions by volume ranges from 50:1 to 550:1. Further, the dissolving facilitates at least one application of the solution to the plant.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
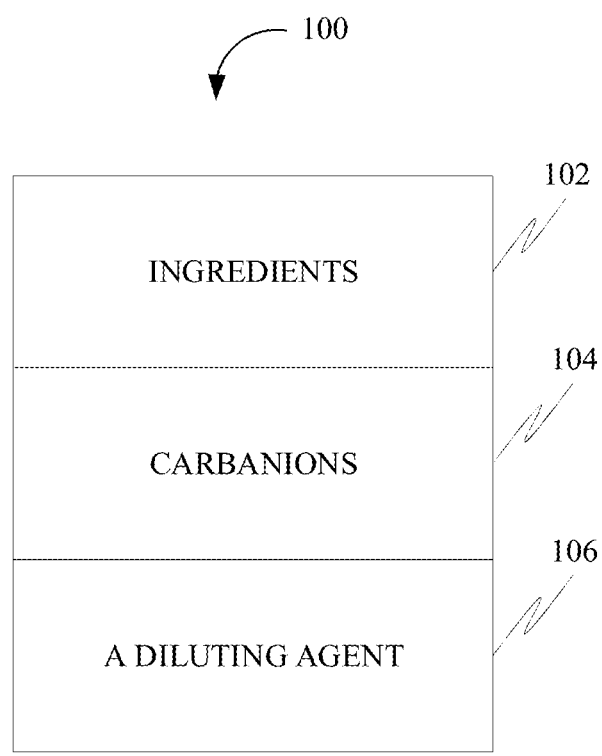
FIG. 1 is a table listing ingredients of an agricultural composition for facilitating treatment of a plant, in accordance with some embodiments.
Figure 2:
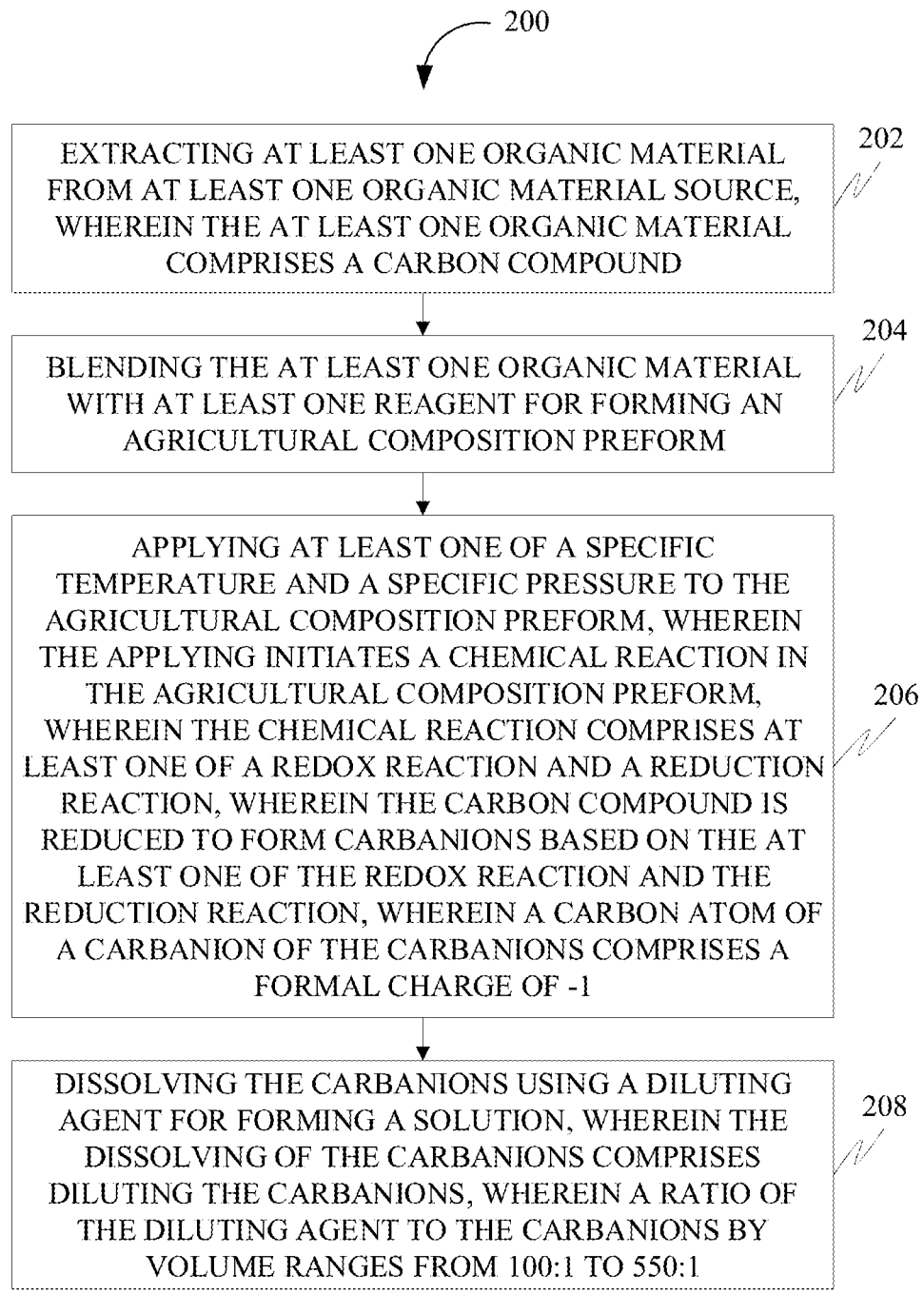
FIG. 2 is a flowchart of a method for producing an agricultural composition to facilitate treatment of a plant, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an agricultural composition for facilitating treatment of a plant, embodiments of the present disclosure are not limited to use only in this context.

Overview

The present disclosure describes an agricultural composition for facilitating treatment of a plant. Further, the agricultural composition may include carbanions. Further, the carbanions facilitate the production of agricultural crops (plant), translocation of nutrients in the plant, the increasing of ERGs in soil, and the increasing of chlorophyll content in the plant. Further, the carbanions facilitate remedying of soil, increasing of electrical conductivity of the soil, and recovering fertilizer from the soil. Further, the carbanions control fungi, bacteria, viruses, and insects present on the plant. Further, the agricultural composition may be metabolic pesticides.

Further, the present disclosure describes a method for the production of the agricultural composition.

Further, the present disclosure describes PicoAg/Carbanion Agriculture (Soil Remediation, Increase Micro Siemens, Fertilizer Recovery, Crop Production, Translocation, ERGS, Chlorophyll, Crop Protection of Fungi, Bacteria, and Insects Control).

Further, the carbanions may include individual atoms. Further, the carbanions may include negatively charged carbon atoms. Further, the negatively charged carbon atom may include a formal charge of −1. Further, the negatively charged carbon atoms may be created by making use of the physical chemistry of carbon atoms. Further, the physical chemistry may be the study of macroscopic, atomic, subatomic, and particulate phenomena in chemical systems in terms of the principles, practices, and concepts of physics such as motion, energy, force, time, thermodynamics, quantum chemistry, statistical mechanics, analytical dynamics and chemical equilibrium. Further, the carbanions may be created by making the use of the physical chemistry of the carbanions. Further, the physical chemistry may be the study of macroscopic, atomic, subatomic, and particulate phenomena in chemical systems in terms of the principles, practices, and concepts of physics such as motion, energy, force, time, thermodynamics, quantum chemistry, statistical mechanics, analytical dynamics and chemical equilibrium. Further, the physical chemistry is the study of how matter behaves on a molecular and atomic level and how chemical reactions occur. Based on the analyses, physical chemists may develop new theories, such as how complex structures are formed. Physical chemists often work closely with materials scientists to research and develop potential uses for new materials. Further, the physical chemistry may be used in observing the assembly of molecules and determining, measuring, and quantifying the assembly of the molecules. Further, diffraction, infrared, and microscopy methods are used for observing the assembly of the molecules and further determining, measuring, and quantifying the assembly of the molecules. Further, the physical chemistry may be used for developing better ways to measure and quantify aspects of the ingredients for developing better products. Further, physical chemistry provides an understanding of the physical properties of atoms and molecules, the way chemical reactions work, and what these properties reveal. Further, the physical chemistry involves analyzing materials, developing methods to test and characterize the properties of materials, developing theories about these properties, and discovering the potential use of the materials. Using sophisticated instrumentation and equipment has always been an important aspect of physical chemistry. Most physical chemistry labs are full of analytical instruments, which may include lasers, mass spectrometers, nuclear magnetic resonance, and electron microscopes. Further, the physical chemistry may provide an understanding of chemical properties and describes the behavior of chemicals using theories of physics and mathematical computations. Further, the properties and reactions of the chemicals may be predicted using the physical chemistry. Physical chemistry describes fundamental physical characteristics of material be it solid, liquid, or gas. Further, the physical chemistry may be used for the development of materials, including plastics, ceramics, catalysis, electronics, fuel, batteries, surfactants, and colloids, and personal care products.

Further, the carbanions may include carbon atoms. Further, the carbon atoms may be associated with CO2 (carbon dioxide) gas. Further, an average person breathes out around 500 liters of the greenhouse gas CO2, which amounts to around 1 kg or 2.3 pounds of mass. Further, the world's population is around 6.8 billion, collectively breathing out around 2500 million tons of the CO2, which is around 7 percent of the annual CO2 tonnage churned out by the burning of fossil fuel around the world. Further, the CO2 breath out by the average person may be a part of a natural cycle, by which the body of the average person may convert carbohydrates from CO2-absorbing plants into energy, plus water and CO2. Further, the average person may breathe the carbon atoms of the CO2 and consume the carbon atoms of plants.

Further, the carbanions may be created using pico-technology. Further, the pico-technology is one of the most promising realms of science, bringing new products to society in many industries. Further, the pico-technology is only about particle having size 1000 times smaller than a nanometer. This technology can be highly beneficial to the agricultural sector. The product is made mostly of Carbon and Nitrogen and trace elements. There are 1000 Pico meters in a nanometer; an inch has 75,000,000 Pico meters, and a human hair is 80,000,000 to 100,000,000 Pico meters thick. Further, pico-technology may be described as involving the alteration of the structure and the chemical properties of individual atoms through the manipulation of energy states of electrons within the individual atoms to produce states with unusual properties, producing some form of exotic atoms. Further, the pico-technology may allow the usage of atoms singularly. Further, the pico-technology may be used for the fabrication of structures where atoms may be positioned with sub-nanometer accuracy. This may be important where interaction with a single atom or molecule may be desired. Further, the pico-technology may be used for altering electron distributions around atoms to promote surface energy to achieve inhibited infection without potential nanomaterial toxicity concerns. Further, the pico-technology may be used to describe the control of electron distribution around the atoms to provide desirable properties. Further, the control of the electron distribution may greatly change surface energy and, thus, the way that proteins adsorb onto a material. Further, the excitement or rearrangement of electrons around the atoms may influence many cellular functions including cell movement, intracellular transport to organelles, adhesion, growth, and ECM formation. Further, the pico-technology may control cellular microtubules (MTs). MTs are cylindrical cellular formations 25 nm in diameter, and they are made out of tubulins. Dynamic instability due to MT plus end-binding proteins also called "plus end-tracking proteins", are able to "surf" the dynamic ends of the MTs. Further, when tips are expressed as green fluorescent proteins, the fluorescence is the brightest at the MT and decreases in intensity toward the minus end of the MT, forming a comet tail. Further, external stimulation is used to excite the MT and end-binding proteins to promote the movement of cells using the pico-technology. This may be a less toxic manner through which to alter surface energy to increase tissue growth since electron distributions may be changed for numerous macro-, micro-, or nanomaterials. Further, the pico-technology may be used to reduce the toxicity in any macro-, micro-, or nanomaterials by exciting electrons. The change in electron distribution, along with the associated charge redistribution, may alter surface energetics to change the adsorption of certain proteins (as well as cellular functions).

Further, the carbanions may be created using Femto-technology. Further, the Femto-technology may be used for creating 8-octet, 9-nonet, 10-dectet, 11-undectet, and 12-duodectet by addition of electron on a carbon atom. Further, the Femto-technology may be used for matter manipulation for modifying the carbon atom.

Further, the carbanions produce tillering in agricultural crops for facilitating the agricultural crop production. Further, an increase in crop production may be caused by tillering. Further, the tillering may increase crop production by 100%. Further, the increase in crop production is a result of translocation that is created by the negatively charged carbon atom having a configuration of 6 protons, 6 neutrons, and 8 electrons. Further, the carbanions mobilize nutrients by fracturing the nutrients for facilitating the translocation into plants (agricultural crops). Further, the carbanions increase ERGs in the soil. Further, ERGs may be associated with Soil Energy. Further, higher ERGs increase nutrients intake rates from the soil to plants.

Further, the present disclosure describes the carbanions for facilitating increasing the production of the agricultural crops (plants). Further, the carbanions may facilitate tillering in the agricultural crops. Further, the tillering may include getting more than one "Plant" or "Shoot" from a seed of a plant. Further, the capability of getting more than one "Plant", "Branches" "Head Rows" "Buds" "Root Mass" or "Shoot" from the seed is also known as "tillering". Further, the tillering may be found in grass crops that have meristematic tissue above each node. These active growth sites can produce another stem (tiller) under the right conditions. Dicots such as soybean do not have the same type of meristems at their nodes so they do not produce more stems or tillers. Rather they have the capability of making branches at the nodes. Branches and tillers have a similar function which is to provide more leaf areas under good growing conditions and the sites for more fruit production. Further, the tillers are produced when the amount of photosynthate (sugar) produced by the plant photosynthesis exceeds the amount of energy required to maintain plant function. In other words, when the plant is producing lots of energy and does not require nearly that much energy to maintain its growth it then makes a tiller. So tillering is a sign of a healthy, actively growing plant that has lots of sunlight, plenty of nutrients, and cool evening temperatures. Further, the carbanions may trigger the tillering that may not be traditional tillering but better plant performance and nutrient uptake which caused the plants to grow better resulting in multiple tillers that are normally not achieved. Further, the tillering may be dependent on hormonal regulation (auxin, cytokinins, and gibberellins) as influenced by certain nutrients balances (Mn, Cu, Zn, Fe, etc.). Further, the tillering may make Christmas trees grow to 6 feet in just 2.5 years instead of 5 years. Further, Corn tillering may increase the growth of the corn up to 15 to 30 more bushels per acre. Further, the corn tillering may produce 15 bu (bushels) more per acre. Further, the corn tillering may produce 30 bu more per acre. Further, more tillering and more height corresponds to the increased production of sugar cane. Further, nitrogen management is key for getting maximum output when growing crops (agricultural crops).

Further, the carbanions may be individual atoms or atoms in covalent bonds. Further, the individual atoms alone or the atoms in the covalent bonds may create powerful electromechanical reactions to disassemble organic material, one atom per atom at a time. Further, the individual atoms alone or the atoms in the covalent bond may work on the fungi, the bacteria, or the viruses to eliminate the fungi, the bacteria, or the viruses.

Further, the carbanions increase Brix levels by 80% in 3 hours and maintained a higher Brix level than untreated for 20 days. Further, the plant may develop frost tolerance. Further, the carbanions performed soil remediation and made old fertilizers available, and mellowed the soil. Further, the carbanions may increase the electrical conductivity (micro Siemens) (EC) of the soil and ERGs in the soil.

Further, a single application of the carbanions may increase electrical conductivity (micro Siemens) levels of the soil by 10%. Further, the carbanions may be configured for rising electrical conductivity of soil about 10% based on dispensing the carbanions in the soil. Further, a solution of the carbanions may moisten the soil for facilitating the dispensing. Further, the carbanions may simulate soil electrical conductivity response. Further, higher electrical conductivity enables more active nutrient transfer from soil to crops. Further, 60 milliliters of the solution are added to 500 grams of moist topsoil in a Ziplock bag. The soil was mixed, then stored for 12 hours to become uniform in moisture by capillary action. Soil treated with either a 1:100 or 1:400 ratio of the solution in water averaged about 10% higher in electrical conductivity than soil moistened with distilled water. Further, the carbanions may raise the electrical conductivity of the ammonium sulphate solution. Further, the carbanions produce a maximum 28% rise in the electrical conductivity of the ammonium sulphate solution with a 1:100 solution of the carbanions. Further, the carbanions may raise the electrical conductivity of the urea solution. Further, the carbanions produce a maximum 28% rise in the electrical conductivity of the urea solution with a 1:100 solution of the carbanions.

Further, the present disclosure describes pico-products comprising the carbanions. Further, the pico-products comprising the carbanions may have the following characteristics:

1). No harm to air (no GWC, ODC, VOHAP, or VOC) soil, or water.
2). cannot be made of organic chemistry, graphene, or nanotechnology, just single atom Pico technology or physical chemistry
3). The goals are primary distribution as an OTC product.
4). It must be made of atomic elements and not molecules.
5). Must be able to kill all pests, be it bacteria, fungi, viruses, and insects.
6). Must be able to deep clean and grow skin and heal wounds just days not weeks
7). Must be able to penetrate the shields of all pests.
8). Must be approved at the State and or Federal FDA or better be exempt.
9). Must be safe for humans, bees, birds, and animals—zero side effects.
10). Must be made of 100% new organic carbon.
11). No Chemicals
12). No Biologicals
13). No Nanotechnology
14). No Graphene
15). No Molecules
16). Eliminate Sickness Further, the pico-products may be formed using the physical chemistry. Further, the pico-products may 89% Biobased Content. Further, the pico-products may include ingredients such as EAFUS: Food Additives. Further, the pico-products may restructure water, and spray rig pressure drops by 19%. Further, the pico-products may increase Brix levels from 100% to 200%. Further, the pico-products may increase the Electrical Conductivity (EC) (micro Siemens) of the soil. Further, the pico-products may increase carbon dioxide consumption. Further, the pico-products may increases ERGS by 2000%. Further, the pico-products may increase Corn, Soybeans, Wheat, Oats, Alfalfa production. Further, the pico-products may provide a spray rig cleaning benefit. Further, the pico-products may provide wind resistance benefits. Further, the pico-products may provide late planting benefits. Further, the pico-products may provide frost resistance. Further, the pico-products may increase 269% Brix in macadamia benefit. Further, the pico-products may stimulate crop production factors. Further, the pico-products don't affect good bacteria. Further, the pico-products may achieve "increasing carbon dioxide consumption". Further, the pico-products may be used as seed wash, germ test 85% untreated to 98% treated. Further, the pico-products may provide tank mixing, water restructuring, lower dynes from 70 to 30. Further, the pico-products may be used for both organic fertilizer & organic pesticides. Further, the pico-products may not pose any health hazards signage to workers, customers, or owners. Further, the pico-products may not require the posting of warnings signs anymore posted to protect customers or workers when spraying or applying the pico-product. Further, the pico-products may not pose any concerns about toxic chemical sprays drifting into neighborhoods or runoff into water or air supply. Further, the pico-products may not pose any concerns over issues associated with registered pesticides when spraying. Further, the pico-products may not require a protected storage area or special handling of dangerous chemicals. Further, the pico-products may not require any special handling, transportation, or equipment. Further, the pico-products may not pose any threat or concern over fees and fines levied by OSHA guidelines. Further, the pico-products may not require any hazardous waste disposal requirements to follow. Further, the pico-products may not invite workmen's compensation claims or lawsuits from customers or workers claiming insecticide exposure. Further, the pico-products may not invite workers compensation fees charged after receiving a waiver for reducing or eliminating pesticides and toxic cleaners. Further, the pico-products may not provide any liability for pollution mitigated for land sales, no cleanup of pesticides. Further, the pico-products may not require any additional labor or costs required for associated spraying and handling. Further, the pico-products may provide a "poison-free" working environment by replacing dangerous fungicides and insecticides, in multiple forms, plus degreaser, toxic detergents, numerous cleaners, and solvents. Further, the pico-products may reduce pesticide and chemical costs by up to 75%. Further, the pico-products may enhance plant root growth and nourishment by breaking the surface tension of water for deeper and more rapid soil penetration. Further, a yield of 105% to 300% of the product is obtained by using the pico-products. Further, the pico-products may appear to strengthen the plant, which provides stronger blooms and increases systemic acquired resistance, defending plants from insects and fungus. Further, the pico-products may increase plant growth by 10% to 300% over a 3-month period of time for starter plants. Further, the pico-products may save 3,000 to 5,000 annually by reducing discarded plants in a nursery. Further, the pico-products may be a non-toxic product that can be recommended and sold to customers and other growers. Further, the pico-products provides increased peace of mind about crop success and non-poisonous operations at reduced costs. Further, the pico-products may facilitate faster crop production and more turnover of crops in fields. Further, the pico-products may facilitate a 15% increase in greenhouses and possibly a 100% increase in annual field production by growing an extra crop per annum. Further, faster crops mean less borrowing costs on crop loans. Further, the pico-products may be alternated, rotated, or mixed with chemicals to lower costs and reduce environmental pollution and worker safety. Further, the pico-products may be used for washing hands, cleaning tools, therefore not spreading diseases from plant to plant or tree to tree or human to customer. Further, 120-day rice crops grown in 100 days with up to 45% yield increase, 120-day onion crop grown in 90 days with 30% more products based on an application of the pico-products. Further, the pico-products may increase the quality of grains and nutrients of crops grown. Further, the pico-products may decrease the plum harvest rejection rate from 65% to only 35%. Further, the quality of fruit and skin now meets the shipping standards. Further, the pico-products may be made from 100% US GOV Food and Drug Administration (FDA) EAFUS food additives. Further, the pico-products may be defined as food by the FDA. Further, the pico-products may improve the plant's electro-mechanical function, which enables cells to communicate more efficiently and be more productive. Further, the pico-products may increase plant Brix/sugar levels by up to 100%. Further, the pico-products may be used to supply nutrients to seeds which encourage germination and vigorous growth. Further, plants sprayed with the pico-products reduce $CO_2$ from the atmosphere by up to 33% in comparison to regular plants by increasing plant sugar levels in the photosynthesis process. Further, the pico-products may produce potential benefits such as claimed carbon credits that help to reduce the price of PicoAg™ (pico-products). Further, the pico-products may be nontoxic, non-hazardous, cost-effective, and humanly safe. Further, the pico-products may reduce hunger, starvation, and poverty with increased production.

Further, the pico-products may include a "PicoAg 4nl 25B". Further, the pico-products may be a biopesticide. Further, the pico-products may control bacteria, insects, fungi, and viruses. Further, the pico-products may be created using Pico technology.

Further, the pico-products qualifies as a Biopesticide, Biostimulant, and Biofertilizer.

Further, the pico-products may be used for the elimination of vital elements in bacteria, insects, fungi, and viruses.

Further, the pico-products is configured for eliminating the cell membrane of the bacteria and puncturing the cell membrane. Further, the eliminating and the puncturing of the cell membrane may drain proteins and lipids from the bacteria.

Further, the pico-products is configured for eliminating the cellulose and chitin of the fungus.

Further, the pico-products is configured for eliminating strands of a nucleic acid of the virus, either DNA or RNA of the virus, and protective protein coat of the virus (the capsid), or a lipid envelope of the virus, surrounding the protein of the virus.

Further, the pico-products is configured for dissolving cellular membranes of the insects, eliminating cells desiccation of the insects, eliminating or penetrating cellular metabolism of the insects, dissolving cuticles of the insects, eliminating lubrication joints of the insects leading to paralysis, stripping the protective shields of the insects, eliminating exoskeleton structure of the insects, and dissolving chitin and protein substances of the insects.

Further, the pico-products immediately impacts the exoskeleton structure of the pest upon contact by disrupting the molecular structure of the chitin and other protein substances that protect the insect. This mechanism of action triggers the rapid and irreversible deterioration of the insect's spiracles and tracheal system, resulting in suffocation. Further, the pico-products kills insects with the elimination of chitin. Further, the chitin is a polysaccharide and a carbohydrate that has a chain of sugar molecules. Further, chitin has a structure like cellulose. Additionally, the chitin may be present in the exoskeletons of the insects.

Further, the pico-products benefit from the revolutionary method of insect control with an absence of undesirable side effects on human health and no harm to the ecosystem. Additionally, unlike standard insecticides in use today, no built-in resistance may be developed by the targeted insects.

Further, the pico-products may be mechanical in primary sequential steps. Further, a first step is a direct interaction between the surface and the outer membrane of the pests, causing the membrane to rupture and leak fluids, proteins, and nutrients.

Further, the pico-products may attack pests at the atom level. Further, at the atom level, the shield of the pests starts to disassemble. Further, the pico-products kills the pests by eliminating the shield.

Lastly, in a few more ways, the pico-products' electro-mechanical effect may affect the pests:
  There may be a second step related to the holes in the outer membrane, through which the pests lose vital nutrients, protein, water, and components, causing a general weakening of the pests.
  Electromechanical effect of the pico-products may affect pests, the pico-products penetrates and dissolves lipid of cellular membranes of the pests.
  This causes cell desiccation to leak water, proteins, and nutrients and collapse.
  By interfering with cellular metabolism during metamorphosis.
  By dissolving cuticles, the lubrication in the insect and joints of the insects, leading to paralysis.

By stripping the pests' protective shields (wax, biofilm, etc.), rendering the pests defenseless against subsequent treatment.

The extracts impact the exoskeleton structure of the pests upon contact by disrupting the molecular structure of the chitin and other protein substances that protect the insect.

The extracts may have the ability to penetrate complex hydrocarbon chains and disintegrate the insects.

The change in the environment for growth with PH from acidophils and neutrophils to alkaliphiles.

Further, the pico-products may be configured for punching holes in a cell of the pests. Further, the punching of the holes in the cell breaches a main defense of the cell. Further, an unopposed stream of the pico-products enters the cell. This puts several vital processes inside the cell in danger. Further, the pico-products overwhelm the inside of the cell and obstruct cell metabolism (i.e., the biochemical reactions needed for life). Further, the pico-products bind to enzymes of the cell halting the activity of the cell. Further, the pests no longer "breathe", "eat", "digest", "reproduce" or "exist".

Further, an outer membrane of the cell, including that of a single cell organism like pests, is characterized by a stable electrical micro-current. This is often called "transmembrane potential", and is literally, a voltage difference between the inside and the outside of a cell. It is strongly suspected that when a pest comes in contact with the pico-products, short-circuiting of the current in the cell membrane may occur. Further, the current weakens the outer membrane and creates holes for leaking water, proteins, and nutrients from the cell.

Further, the pico-products effects fast and affect such a wide range of pests. The experiences observed explain the speed with which pests and other pests perish on pico-products surfaces by the multi-targeted effects. Further, membrane perforation may inhibit any given enzyme that "stands in its way," and stops the cell from transporting or digesting nutrients, repairing its damaged membrane, and breathing or multiplying. This makes the pest harmless to humans, birds, and animals. This has no side effects or harm on human, birds, and animal health. These solutions do not harm mammal cells nor do the solutions attack the neurological systems of humans, birds, and animals. Further, the pico-products may lyse cells to extract protein or organelles, or to permeabilize the membranes of living cells.

The pico-products dissolves lipids from cell membranes making the cell membranes permeable to antibodies. Because the organic solvents also coagulate proteins, the pico-products may be used to fix and permeabilize cells at the same time. Saponin interacts with membrane cholesterol, selectively removing it and leaving holes in the membrane. Permeabilization is the process of making something, such as a membrane or cell wall, permeable. Lyse is a verb referring to the process of lysis, the death of a cell. Lysis refers to the breaking down of the membrane of a cell, often by viral, enzymic, or osmotic mechanisms that compromise cell integrity. A fluid containing the contents of lysed cells is called a lysate. In molecular biology, biochemistry, and cell biology laboratories, cell cultures may be subjected to lysis in the process of purifying the components, as protein purification, DNA extraction, RNA extraction, or purifying organelles.

Trophobiosis Cycle: Pesticides weaken plants. Weakened plants open the door to pests and disease. Further, the pesticides precipitate pest attacks and disease susceptibility, and thus the pesticides induce a cycle of further pesticide use.

Further, the pico-products may include an agriculture Product "PicoAG 4-N-1". Further, the agriculture Product "PicoAG 4-N-1" may be made of only atoms 1000 times smaller than nanometer and made of Femto-technology (Electrons, Protons, Neutrons) elements.

Further, the pico-products may include PicoAg. Further, the PicoAg may facilitate the tillering for increasing the production of the agricultural crop. Further, the PicoAg may replace Ag Pesticides, Ag Fertilizer, Ag Remediation, and Ag Production with No Side Effects with a single product of atoms 100% organic matter.

Further, 2 applications of the PicoAg at a rate of 1.5 oz. (S2.00 US Dollars) per 16 liters of water (7 spray loads/application) is applied to the sugarcane. Further, a Sugarcane Farm Sprayed with the PicoAg may provide relatively uniform growth of the sugarcane in height and size, increase in no. of tillers to 12-15 tillers per hill, and increase in a height of the sugarcane to 5 ft. and 6 inches, reduction in pests Infestation none. Further, the tillering was increased on PicoAg treated plants by 250% compared to normal plants. Further, the PicoAg may be applied to a palm tree. Further, 1 application of the PicoAg at a rate of 1.5 oz. (2.00 US Dollars) per 16 liters of water (7 spray Loads/application) may be applied to the palm tree. Further, the PicoAg increases the height and size of the palm tree. The leaves of the palm trees are larger and exhibited a shiny green appearance.

The use of PicoAg is all about timing. If the timing is off, the production may be less. Further, the PicoAg can be used from 1 to 7 times. 97% of the farmers only use the PicoAg for Planting and Herbicide Passes. Further, the PicoAg can be used by farmers at BURNDOWN Herbicide pass and it is recommended to add AMS to kill Weed. The other benefits of the BURNDOWN usage are Spray Rig Cleaning and EC Soil Remediation. The PicoAg may mobilize the tied up nutrients from chelation. Further, the PicoAg can be used with a liquid at 3 oz. per acre with 10 gallons of water at seed planting in seed furrow or 2×2. Further, the PicoAg may be sprayed to the plant at the 3 leaf stage of the plant. Further, 5 oz. of the PicoAg per acre with 10 gallons of water per acre is sprayed to the plant. Further, the PicoAg can be used with Herbicide pass and it is recommended to add AMS to kill a weed. The PicoAg can be used last time 20 days passed Herbicide Pass to push the crops. The PicoAg has been used for extending the time a plant can grow. The PicoAg has been used for Frost protection on Corn, Soybeans, Tobacco, and Tomato.

Further, the PicoAg helps plant nutrient availability by fracturing and mobilization of tied up plant nutrients. Further, the mechanism for increased production may include soap ingredients acting as a vehicle for plant nutrient entry and assimilation. Further, the PicoAg may be configured for getting nutrients into the plants through the back door. Further, the PicoAg releases metal ions from their attachment sites. Further, the PicoAg blended in a water solution with chelated trace elements increases the availability of those traces to crops when foliar-applied on crops. Further, the PicoAg greatly reduces the surface tension of water, which improves leaf contact and enhances the internal translocation of nutrients through crop xylem and phloem systems. The PicoAg is also a solvent that softens the waxy cuticle on leaves so nutrients can easily enter plant circulation pathways. All ingredients in the PicoAg are derived from plants, so crops readily absorb and metabolize the PicoAg. Very small amounts of the PicoAg are needed to "amplify" foliar sprays just four or five ounces per acre.

Further, the PicoAg may add energy, and organic nitrogen to the plants without losing, leaching, or burning up the soil carbon. Further, adding 2 mL of the PicoAg in a ratio [500:1] to the soil increase the ERGs of the soil up to 1800. Further, the PicoAg increases the chlorophyll in the plants. Further, the increase in the chlorophyll has all kinds of benefits like a less fertilizer requirement after planting of the plant. Further, the PicoAg may be a Non-GMO organic plant biostimulant resulting in enhanced quantity and higher nutrient density quality production of all agricultural major crops. Further, PicoAg is a unique and powerful agro-input capable of enhancing the health of plants & increase crop yield. It's a Non-GMO and organic product made of plant extracts. It dramatically boosts production in any soil, any region, and works in all kinds of Crops and vegetables. This eliminates the health hazards for farmers and consumers. Further, the PicoAg may provide shorter and higher plant germination time, increased growth, more yield, and improves disease and pest resistance. The PicoAg is made of the highest grade of food ingredients. Further, the PicoAg may increase yield ranging from 40%-300% in agricultural crops and vegetables. The PicoAg does not contain any toxic or hazardous components, hormones, chemicals, pesticides, any synthetic material, and is safe for all plants, humans, and animals. It is non-carcinogenic.

The PicoAg has been proven to be effective at 16,000 to 1 and as high as 32,000 to 1 dilution. The Elements can be both an organic cation-anion separator as well as a cation-anion translocator to feed plants and it can increase the Brix levels in plants, which increases CO2 consumption that gives life to plants. It is not toxic organic chemistry, it's the traditional sustainable nutrient for plants, and there are no residuals to harm the environment, oceans, humans, animals, birds, or living creatures. It's also the best technology for soil and water remediation mobilizing chelated immobilized tied up nutrients. This is Photosynthesis without an increase in CO2 Consumption.

Further, the PicoAg possesses a unique ability to substantially increase the level of sugar production within the leaves of a plant to a great extent. This, in turn, acts to accelerate the function of photosynthesis with the result that the treated plant becomes healthier, more disease-resistant, and faster growing. This results in larger crop yield and quality output. The germinating seed produces an embryonic root (radical) that grows into the soil, in response to the earth's gravitational field. As new cells are added, the root elongates producing hair roots and lateral roots. The roots remain interconnected, producing a network of living cells throughout the soil. Within the root, the inner cells become specialized to conduct solutes (water+substances dissolved in it) from the root to the shoot (via xylem) and from the shoot to the root (via phloem). Flow from the shoot to the root is achieved by loading sugars produced in the leaves into the phloem. The sugar-laden solute moves downward, to the sites of lower concentration in the root. The xylem, carrying solute from the roots to the shoot, acts like a bundle of capillary tubes, supporting the water in a vertical reservoir. The leaves of the plant actively lose water through pores at the surface (transpiration), drawing the water in the xylem upwards. By this method, essential nutrients extracted from the soil are transported to sites of growth and production in the shoot. The surface of the leaf is specialized for trapping energy from light (photosynthesis) and storing it as sugars and starch. Therefore the upper leaf surface must be angled to face the sun, which causes its surface temperature to rise 10 degrees C. above the ambient air temperature. To control water loss, most leaves have a thick water resilient waxy layer. The specialized openings that control the rate of water loss (stomata) tend to be more numerous on the underside of the leaf. Accordingly, leaves are not adapted for taking up nutrients. It's the mass flow of solutes from the soil to the roots that provide the greatest amount of nutrients for plants. Further, the PicoAg acts to stimulate new growth and development when applied to bare root stock before planting, or saturating the root structure when in place. It dissolves NPK from the roots, thereby enhancing nutrient uptake into the plant. Nutrient uptake is expedited from the inclusion of sodium within the formulation. Sodium is a cation, which is an atom or group of atoms carrying a positive electric charge. The positive charge results because there are more protons than electrons in the cation. The negatively charged anions are attracted to the positive sodium cation, attach themselves, and hitch a ride into the plant. In other words, NA+ is a Sodium Transporter conveying nourishment directly to the plant. The reason for this nutrient effect is the minuscule size of the molecules, which allows them to enter the plant cells (in the leaves), where the sugar factory is located. This causes a maximized increase in photosynthesis, which is the basis for the starches, cellulose, waxes, carbohydrates, oils, and protein that are the building blocks for all plant growth. Perhaps an equally powerful stimulant to plant growth occurs when nutrition is provided directly to the leaves, through the stomata using the foliar feed. In the early morning hours, or later in the afternoon, when the ambient air temperature falls below that of the ground temperature, the stomata will open and make themselves susceptible and amenable to the uptake of fluids and nutrients. Due to the Pico sized particles that comprise the PicoAg, they are able to easily enter the stomata of the leaves, where their beneficial effect can be more directly accepted by the plant. Therefore, it is highly suggested that in order to maximize the nutritional boost possible from the spraying of the PicoAg, the leaves be sprayed both from above and below, as per the application protocol. The plants sprayed with the PicoAg appear to grow more swiftly, be healthier and bear larger crops, the only explanation is that this could only be attributed to an increase in the level of photosynthesis within the leaves. Further, the PicoAg may increase the sugar content of the leaves increased by a factor of slightly more than 50%, within seven days of spraying, compared with neighboring plants that were not sprayed. What was even more interesting was that so long as the plants were sprayed at 7 or 10-day cycles, the sugar content remained at an increased constant 50%+ level. Once spraying was discontinued, the sugar level returned to normal after about four to five weeks, indicating a direct correlation between the application and non-application of the spray. In addition to being stronger and more disease resistant, the crop can be expected to be larger, and very often the size of the individual fruit, nut, flower, etc. will be significantly greater. The healthier plants also appear to be less prone to fungal or bacterial disease and to be much more pest resistant. This appears to confirm the field reports that there are significantly larger crops and fruit size when compared with the previous years of normal farming practice.

Further, the PicoAg increases the electrical conductivity (micro Siemens) of the soil. Further, the PicoAg replaces 300 lbs. of fertilizers with 8 oz. of the PicoAg. Further, 1 cubic inch of the PicoAg can be spread to an 11.9 Acre of surface area at 1 nanometer thick, where 1 square inch has 5400 trillion Pico meters. This large surface area of colloids, and their highly energetic reaction due to their small size, makes the PicoAg highly effective in carrying other blended products into plant leaves (such as herbicides or foliar nutrients) and transporting nutrients through the plant's circulatory system. Below 50 nanometers, normal chemical reactions are dramatically changed. This gives materials surprising new properties. When reduced to "Nano" size, a red compound may appear green. All molecules have a positive or negative electrical charge. Thus all living cells are electromagnetic. Plant growth and nutrient exchange occur with "biological ionization," or transfer of ions. Electrical charges and magnetism have an impact on how molecules behave. In conventional PicoAg 25B, two positive poles of a magnet repel one another, and a positive and negative pole attract each other. However, when molecules are refined to the Pico level, positive molecules attract other positive molecules. This only happens at the pico-scale size. Plants, humans, and animals in essence are electromagnetic and are governed by the Periodic Law and table. In photosynthesis, plants require the radiation from the sun plus six molecules of water and six molecules of carbon dioxide to make one basic sugar molecule and six molecules of oxygen. The plants give off oxygen into the atmosphere during photosynthesis. The plants use a molecule of basic sugar manufactured as the foundational building block for roots, stems, leaves, and fruit or grain. Further, the basic sugar molecule is important in the whole equation of plant growth. Further, increasing the production of sugar and other dissolved solids in plants may have a major impact on plant production and quality. The percentage of sugars and dissolved solids in plant solution is referred to as a "Brix" reading. The PicoAg is able to enter into the plant's cells due to its very small Pico atoms size. Although it doesn't have large amounts of nutrients normally expected of foliar fertilizers, its pico-sized colloids are able to diffuse into the plant cells, increasing sugar production. When the PicoAg is applied early in a plant's germination and rooting stage, such as the two-leaf stage of corn and soybeans, translocation of leaf sugars to the root generates more exudates from new roots. Soil organisms respond by converting more nutrients in the soil. The resulting larger root system helps crops keep growing through dry periods during the season. We've seen the largest yield differences in regions and seasons where moisture is limited, or soil has low organic matter. Sodium molecules which are cations (positively charged molecules) make up a sizeable amount of the Adjuvant product. These cations increase electrical conductivity in the nutrient solutions circulating in the crop's xylem and phloem circulation system. The basic photosynthesis process described above is often written as this formula:

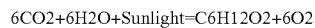

In effect, carbon dioxide and water plus energy may form simple sugar and release oxygen into the atmosphere. But the secondary reactions of photosynthesis are far more complex in the plant. In the chloroplasts of the cells sugar factory, four positive magnesium molecules combine with one nitrogen molecule. Nanoscale sodium molecules are attracted to these positive magnesium molecules. Other elements that are chelated (attached) to the sodium also are translocated into the sugar-factory cell. The PicoAg has a strong surfactant effect, which means that the surface tension of water is greatly reduced. Water is "wetter." Within a plant, this apparently reduces the necessary osmotic pressure needed to move nutrient solutions through the crop, between leaves to roots. The net result of the enhanced nutrient transfer is more fuel, energy, and conductivity to boost the sugar-making efficiency of photosynthesis. Further, the PicoAg trials have increased the sugar levels of fruit on a variety of plants. Yield results are most pronounced where normal plant nutrition or moisture is limited. When this higher level of sugars and dissolved solids is achieved, plant production and crop quality increase. Higher nutrient levels in a crop are good. This means the plant has a greater natural ability to defend itself from attacks from pathogens, as a result of having a good supply of nutrients and a high sugar level. The overall effects of using the PicoAg mean that growers achieve benefits by producing healthier, more nutritious food for humans and animals. In high-organic soil and perfect growing seasons, the yield increase may be moderate, but other benefits such as crop quality and resistance to lodging help pay for the application. In stressful seasons or difficult soil, growers report yield increases as high as 33%, with greater plant health. The PicoAg increases the electrical conductivity (micro Siemens) of the soil to loosen the soil. Future agricultural strategies may also include the use of Pico technology instead of nanotechnology to reduce the toxicity since electrons can be excited in any macro-, micro-, or nanomaterials. The change in electron distribution, along with the associated charge redistribution, can alter surface energetics to change the adsorption of certain proteins (as well as cellular functions).

Further, (TPH) are hydrocarbons that exist in crude oil, which is used to make petroleum products. TPH is a family containing hundreds of chemical compounds that were originally derived from crude oil so it is often referred to as hydrocarbon oil, mineral oil, and grease. Further, the hydrocarbons are molecules that include hydrogen and carbon atoms. Hydrocarbon examples in everyday life include paraffin and isopropyl alcohol. Once formed, hydrocarbons combine easily with other atoms to create organic compounds. TPH are mixtures of chemicals that are mainly made from hydrocarbons. Examples of chemicals found in TRPH include Hexane, Benzene, Toluene, Xylene, Naphthalene, Fluorene, and Components of gasoline, mineral oils, and other petroleum products. It would be impractical to measure the full scope of TPHs present at a given site, but obtaining a composite amount of TPH found in a sample can help identify the extent of the contamination. These hundreds of components can be divided into groups, known as petroleum hydrocarbon fractions, based on how they act in soil and water. These petroleum hydrocarbon fractions allow scientists at Phoslab Environmental Laboratories to measure the concentrations of TPH. Further, the TPH is released into the environment through accident-prone leakages from industries and as byproducts from commercial or private uses. Total petroleum hydrocarbons in water typically show up in the form of a thin surface film, while heavier fractions might appear as sediment at the bottom of the waterbed. Total petroleum hydrocarbons in soil may become absorbed by groundwater. Everyone is exposed to some amount of TPH; components are airborne. Prolonged exposure, however, is dangerous and poses a threat of contamination of the TPH. Certain occupations such as those involved in extracting and refining crude oil face a more significant risk through inhalation of airborne contaminants and skin contact. Underground contamination such as from a leaking storage tank can expose others through drinking water and contact with ground soil. To minimize contamination, Phoslab Environmental uses state-of-the-art technology to test a wide variety of samples to accurately measure the TPH concentration in air, water, or soil. While most people inhale and exhale petroleum hydrocarbons on a daily basis, prolonged exposure can lead to any number of health complications. Reported TPH health effects include Headaches, Dizziness, Peripheral neuropathy, Irritation of skin, and eyes, Permanent damage to liver, kidneys, and lungs, and Complications in pregnancy. Health risks vary depending on the length of the exposure and the toxicity of individual TPH compounds. In some cases, exposure can be deadly. Further, Pico-Clean comprising the carbanions is configured for removing TRPH (o-Terpheny C18H14 & n-Triacontane C30H62) 99.997%, except for 38 Mg/Kg/9680 Mg/Kg=only 0.00392562%. Further, Pico-Clean may be configured for Oil and Starch Remediation.

FIG. 1 is a table 100 listing ingredients of an agricultural composition for facilitating treatment of a plant, in accordance with some embodiments. Further, the table 100 may include a column 102 and two rows 104-106. Further, the table 100 may include two cells (column 102, row 104) and (column 102, row 106). Further, the agricultural composition may include carbanions and a diluting agent.

Further, a cell (column 102, row 104) of the table 100 may be related to the carbanions. Further, a carbanion of the carbanions may include a carbon atom. Further, the carbon atom may include a formal charge of −1.

Further, a cell (column 102, row 106) of the table 100 may be related to the diluting agent. Further, the diluting agent may include water. Further, the diluting agent may include a solvent. Further, the diluting agent may be capable of dissolving the carbanions for forming a solution. Further, the dissolving of the carbanions may include diluting the carbanions. Further, a ratio of the diluting agent to the carbanions by volume ranges from 50:1 to 550:1. Further, the dissolving facilitates at least one application of the solution to the plant. Further, the diluting agent may include water. Further, the plant may include at least one agricultural crop. Further, the at least one application may include spraying, dispensing, etc. Further, the at least one application may include an in-furrow application, a foliar application, etc. Further, the solution may be applied to the plant in at least one vegetative state of the plant.

Further, in some embodiments, the ratio of the diluting agent to the carbanions by the volume may be 375:1.

Further, in some embodiments, the ratio of the diluting agent to the carbanions by the volume may be 533:1.

Further, in some embodiments, the ratio of the diluting agent to the carbanions by the volume may be 320:1.

Further, in some embodiments, the ratio of the diluting agent to the carbanions by the volume may be 400:1.

Further, in some embodiments, the carbanions are derived from at least one organic material. Further, the at least one organic material may be associated with at least one plant. Further, the at least one organic material may be 100% biomass.

Further, in some embodiments, the carbon atom may be associated with a hybridization state. Further, the hybridization state may be sp3 hybridization state. Further, the carbon atom in the sp3 hybridization state may be trivalent. Further, the carbon atom in the sp3 hybridization state may include a lone pair of electrons on the carbon atom. Further, the carbon atom in the sp3 hybridization state forms three single bonds.

Further, in some embodiments, the solution may include a dispersing agent capable of dispersing the carbanions in the diluting agent. Further, the carbanions are present in the solution in a form of granules. Further, a size of a granule of the granules may be 340 pm (picometer).

In further embodiments, the agricultural composition may include a chelating agent capable of chelating at least one nutrient associated with the plant. Further, the solution may be capable of mobilizing the at least one nutrient from the chelating agent to the plant based on the at least one application of the solution to the plant. Further, the at least one nutrient may include a micronutrient, a macronutrient, etc. Further, the at least one nutrient may include Mn (manganese), Cu (copper), Zn (zinc), Fe (iron), etc.

Further, in some embodiments, the solution may include a surface tension reducing agent capable of reducing a surface tension of water associated with the plant. Further, the solution may be capable of enhancing an internal translocation of at least one nutrient associated with the plant through at least one of a xylem system and a phloem system of the plant based on the reducing. Further, the at least one nutrient may include a micronutrient, a macronutrient, etc. Further, the at least one nutrient may include Mn (manganese), Cu (copper), Zn (zinc), Fe (iron), etc.

Further, in some embodiments, the solution may include a solvent agent capable of softening a surface of at least one part of the plant based on the at least one application of the solution to the plant. Further, the at least one part of the plant may include leaves. Further, the solvent agent softens a waxy cuticle disposed on the surface of the leaves based on the at least one application. Further, at least one nutrient enters into at least one circulation pathway of the plant through the surface of the at least one part of the plant based on the softening. Further, the at least one nutrient may include a micronutrient, a macronutrient, etc. Further, the at least one nutrient may include Mn (manganese), Cu (copper), Zn (zinc), Fe (iron), etc.

Further, in some embodiments, each carbanion of the carbanions may be capable of creating an electromechanical reaction with an organic material of at least one organism present on the plant based on the at least one application of the solution. Further, the at least one organism may include bacteria, insects, fungi, viruses, etc. Further, the organic material may include lipid, protein, etc. Further, the creating of the electromechanical reaction disassembles the organic material for eliminating the at least one organism. Further, the carbanions may be capable of controlling the fungi, the bacteria, the viruses, the insects, etc. present on the at least one agricultural crop based on the eliminating.

Further, in some embodiments, the at least one application of the solution may include dispensing the solution in soil associated with the plant. Further, the carbanions are cable of increasing an electrical conductivity of the soil based on the dispensing. Further, at least one nutrient transfers from the soil to the plant based on the increasing of the electrical conductivity. Further, the solution may moisten the soil based on the dispensing. Further, the solution may simulate an electrical conductivity response of the soil. Further, the increasing of the electrical conductivity enables more active transfer of the at least one nutrient from the soil to the plant. Further, the at least one nutrient may include a micronutrient, a macronutrient, etc. Further, the at least one nutrient may include Mn (manganese), Cu (copper), Zn (zinc), Fe (iron), etc.

Further, in some embodiments, the solution may include a pesticide. Further, the pesticide may be capable of eliminating the at least one of the fungi, the bacteria, the viruses, and the insects from the at least one agricultural plant. Further, in an embodiment, the pesticide may be a metabolic pesticide. Further, the metabolic pesticide generates a metabolite based on the at least one application of the metabolic pesticide. Further, the metabolite may include a plurality of single carbanions. Further, the plurality of single carbanions may be capable of eliminating the at least one of the fungi, the bacteria, the viruses, and the insects from the at least one agricultural plant.

Further, in some embodiments, the at least one organic material source may include biomass. Further, the carbanions may be bio-based.

Further, in some embodiments, the carbanions may be provided in a dosage for facilitating the production of the at least one agricultural crop. Further, the dosage may include 5 oz. per acre. Further, the 5 oz. may include 1765 drops. Further, the 1765 drops may include at least 8,875 sextillion carbanions.

Further, in some embodiments, the carbanions may be provided in a dosage for facilitating soil remediation and fertilizer recovery of the soil. Further, the dosage may include 8 oz. per acre. Further, the 8 oz. may include 2840 drops. Further, the 2840 drops may include 14,200 sextillion carbanions.

Further, in some embodiments, the carbanion may include negatively charged carbon atoms. Further, the negatively charged carbon atoms may not be active ingredients. Further, the negatively charged carbon atoms may attract positive atoms and release the vital fluid from at least one of the fungi, the bacteria, the viruses, and the insects causing the elimination of the at least one of the fungi, the bacteria, the viruses, and the insects. Further, the negatively charged carbon atoms may make surfaces of the pests positively charged by knocking electrons out from the surfaced of pests.

Further, in some embodiments, the carbanions may forms particles in the solution. Further, the particles may be associated with a particle size. Further, the particle size may be less than 1 nanometer in a straight solution. Further, in an instance, the particle size may be 0.6 nm or 600 pm. Further, the carbanions may include micelles structures. Further, the micelles structure may include a spherical shape. Further, most micelles may be 0.6 nm in particle size hydrodynamic radius.

Further, in some embodiment, the carbanion of the carbanions may include a single negatively charged carbon atom. Further, the single negatively charged carbon atom bond to no other atoms except for another single negatively charged carbon atom.

Further, the carbanion may include "Negative Octet Energy". Further, the carbanion may be an anion in which the carbon-atom bears a formal negative charge.

In further embodiments, a product may include the carbanions and the diluting agent. Further, the product may include PicoAg 25BF. Further, the PicoAg 25BF may be 100% organic matter. Further, the organic matter may include organic carbon atoms. Further, the PicoAg 25B may be 89% New Carbon. Further, a new carbon atom may be 100% organic. Further, in an embodiment, the product may include PicoAg 25BF. Further, the PicoAg 25BF may be configured recovering of the fertilizer in the soil. Further, the PicoAg 25BF may be configured for making the fertilizer in the soil. Further, the PicoAg 25BF may be configured for applying on the soil. Further, the PicoAg 25BF may be associated a product concentration. Further, the PicoAg 25BF may be configured for increasing a concentration of at least one element present in the soil based on the applying. Further, the concentration may be associated with parts per million (ppm). Further, the parts per million may be associated with mill moles/l. Further, the at least one element may include at least one ion, at least one chemical element, at least one compound, etc. Further, the at least one chemical element may include Ferrum (Fe), Manganese (Mn), Zinc (Zn), etc. Further, the at least one ion may include at least one monoatomic ion, at least one polyatomic ion, etc. Further, in an embodiment, the PicoAg 25BF may kill the viruses by eliminating strands of nucleic acid of the viruses, either DNA or RNA of the viruses, and protective protein coat of the viruses (the capsid), or a lipid envelope of the viruses surrounding the protein of the viruses.

In further embodiments, PicoAg may include the carbanions. Further, the PicoAg may be applied to the at least one agricultural crop using the in-furrow application. Further, the at least one agricultural crop may include Grain Sorghum. Further, the PicoAg may be applied in a dosage. Further, the dosage may include 1.25 oz. per acre. Further, in an embodiment, the Sosoap may be applied to the at least one agricultural crop in a number of applications during a specified period. Further, a dosage of the PicoAg may be applied in the number of applications. Further, in an embodiment, the PicoAg may be applied to the at least one agricultural crop using the foliar application. Further, the PicoAg may be blended with the diluting agent to form the solution. Further, the solution may be applied to the at least one agricultural crop. Further, the solution with chelated trace elements increases the availability of the trace elements to the at least one agricultural crop. Further, in an embodiment, the PicoAg may be applied in the solution. Further, the solution may include the PicoAg in at least one PicoAg volume and the diluting agent in at least one diluting volume. Further, the at least one PicoAg volume may be 1.5 oz. Further, the diluting agent may include water. Further, the at least one diluting volume may be 16 liters. Further, the solution may be applied to the at least one agricultural crop in a dosage. Further, the dosage may be applied to the agricultural crops in the number of applications.

FIG. 2 is a flowchart of a method 200 for producing an agricultural composition to facilitate treatment of a plant, in accordance with some embodiments. Further, at 202, the method 200 may include a step of extracting at least one organic material from at least one organic material source. Further, the at least one organic material source may include at least one plant. Further, the at least one organic material may be 100% biomass. Further, the at least one organic material may include a carbon compound. Further, the carbon compound may be an organic carbon compound.

Further, at 204, the method 200 may include a step of blending the at least one organic material with at least one reagent for forming an agricultural composition preform. Further, the at least one reagent may include a reducing agent.

Further, at 206, the method 200 may include a step of applying at least one of a specific temperature and a specific pressure to the agricultural composition preform. Further, the applying initiates a chemical reaction in the agricultural composition preform. Further, the chemical reaction may include at least one of a redox reaction and a reduction reaction. Further, the carbon compound may be reduced to form carbanions based on the at least one of the redox reaction and the reduction reaction. Further, the at least one reagent reduces the carbon compound to form the carbanions based on the applying. Further, a carbon atom of a carbanion of the carbanions may include a formal charge of −1.

Further, at 208, the method 200 may include a step of dissolving the carbanions using a diluting agent for forming a solution. Further, the diluting agent may include water. Further, the dissolving of the carbanions may include diluting the carbanions. Further, a ratio of the diluting agent to the carbanions by volume ranges from 50:1 to 550:1. Further, the dissolving facilitates at least one application of the solution to the plant. Further, the plant may include at least one agricultural crop. Further, the at least one application may include spraying, dispensing, etc. Further, the at least one application may include an in-furrow application, a foliar application, etc. Further, the solution may be applied to the plant in at least one vegetative state of the plant.

Further, in some embodiments, the at least one of the redox reaction and the reduction reaction adds a pair of electrons to a carbon atom of the carbon compound for producing the carbanion. Further, the carbon atom may be associated with sp3 hybridization state. Further, the carbon atom in the sp3 hybridization state may be trivalent. Further, the carbon atom in the sp3 hybridization state may include a lone pair of electrons on the carbon atom.

Further, in some embodiments, the solution may include a dispersing agent. Further, the dispersing agent may be capable of dispersing the carbanions in the diluting agent. Further, the carbanions are present in the solution in a form of granules. Further, a size of a granule of the granules may be 340 pm (picometer).

In further embodiments, the method 200 may include a step of adding a chelating agent to the solution. Further, the chelating agent may be capable of chelating at least one nutrient associated with the plant. Further, the solution may be capable of mobilizing the at least one nutrient from the chelating agent to the plant based on the at least one application of the solution to the plant.

Further, in some embodiments, the solution may include a surface tension reducing agent. Further, the surface tension reducing agent may be capable of reducing a surface tension of water associated with the plant. Further, the solution may be capable of enhancing an internal translocation of at least one nutrient associated with the plant through at least one of a xylem system and a phloem system of the plant based on the reducing.

Further, in some embodiments, the solution may include a solvent agent. Further, the solvent agent may be capable of softening a surface of at least one part of the plant based on the at least one application of the solution to the plant. Further, at least one nutrient enters into at least one circulation pathway of the plant through the surface of the at least one part of the plant based on the softening.

Further, in some embodiments, each carbanion of the carbanions may be capable of creating an electromechanical reaction with an organic material of at least one organism present on the plant based on the at least one application of the solution. Further, the creating of the electromechanical reaction disassembles the organic material for eliminating the at least one organism.

Figure 3:
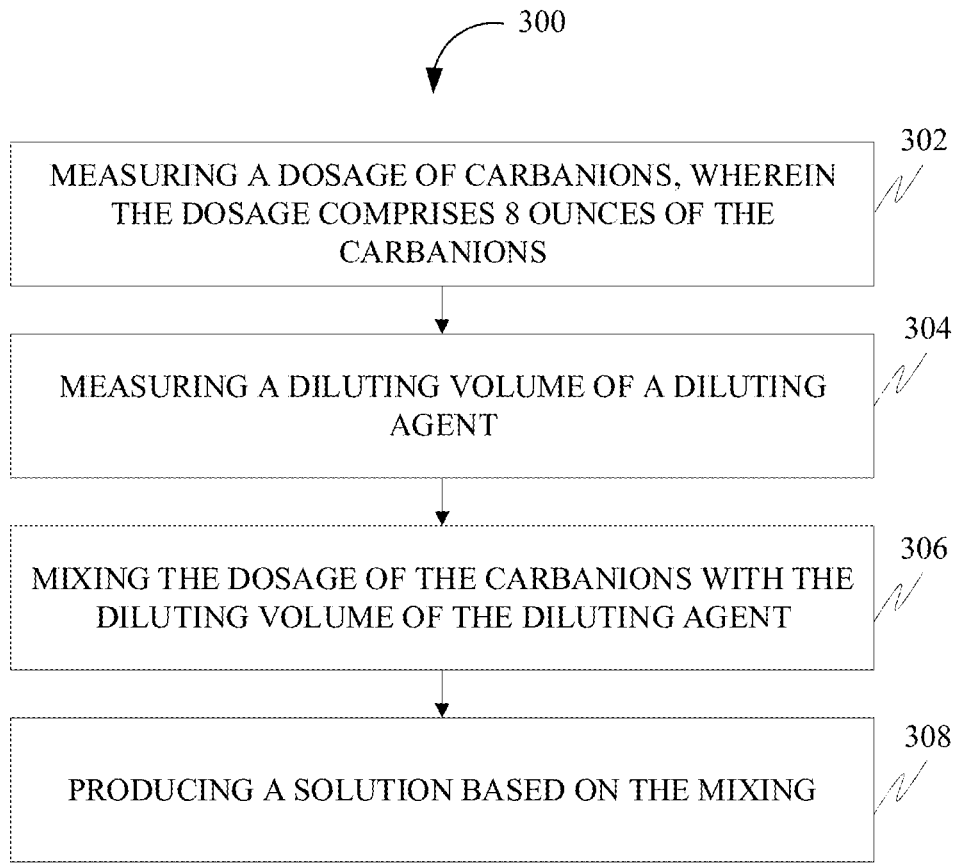
FIG. 3 is a flowchart of a method for producing a solution of the carbanions and a diluting agent, in accordance with some embodiments

FIG. 3 is a flowchart of a method 300 for producing a solution of the carbanions and a diluting agent, in accordance with some embodiments. Further, the solution may be dispensed on the soil of 1 acre of land. Further, the solution may be applied to the plant using at least one application of the solution. Further, at 302, the method 300, may include a step of measuring a dosage of the carbanions. Further, the dosage may include 8 ounces of the carbanions. Further, the 8 ounces may include 2840 drops. Further, the 2840 drops may include 14,200 sextillion carbanions.

Further, at 304, the method 300 may include measuring a diluting volume of the diluting agent. Further, the diluting agent may include water. Further, the diluting volume may be 16 liters.

Further, at 306, the method 300 may include a step of mixing the dosage of the carbanions with the diluting volume of the diluting agent. Further, a ratio of the diluting agent to the carbanions by volume is 70:1.

Further, at 308, the method 300 may include a step of producing the solution based on the mixing. Further, the solution may be applied to the plant using at least one application. Further, the at least one application may include spraying, dispensing, etc. Further, the at least one application may include an in-furrow application, a foliar application, etc.

Figure 4:
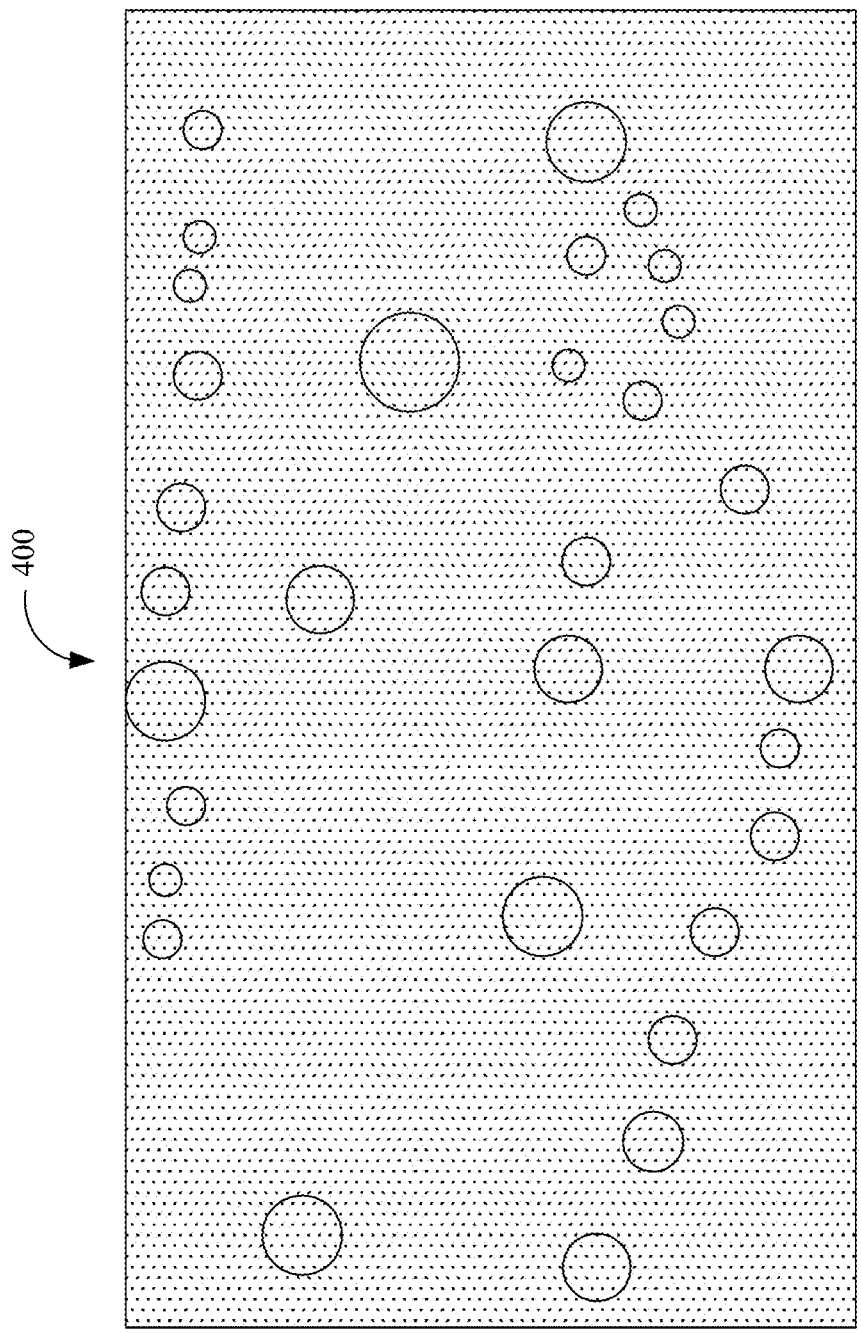
FIG. 4 is an illustration of carbanions of the agricultural composition, in accordance with some embodiments.

FIG. 4 is an illustration of carbanions 400 of the agricultural composition, in accordance with some embodiments. Further, the carbanions 400 may be derived from at least one organic material source. Further, the at least one organic material source may include at least one plant. Further, the carbanions 400 may include carbon atoms extracted from the at least one plant. Further, the carbanions 400 may include a 100% organic matter. Further, the organic matter may be organic carbon atoms. Further, at least one of a specific temperature and a specific pressure may be applied to the carbon atoms for initiating at least one of a reduction reaction and a redox reaction. Further, the at least one of the reduction reaction and the redox reaction adds 2 electrons to the carbon atoms for creating negatively charged carbon atoms. Further, each negatively charged carbon atom of the negatively charged carbon atoms may include 8 electrons and 6 protons, and 6 neutrons. Further, the negatively charged carbon atoms may be highly negatively charged. Further, the negatively charged carbon atoms may be the carbanions 400. Further, the carbanions 400 may include a trivalent carbon atom comprising eight (8) electrons in the valence shell of the trivalent carbon atom. Further, the carbanions 400 may be created using physical chemistry of the carbanions 400. Further, the carbanions 400 may include micelles structures. Further, the micelles structure may include a spherical shape.

Figure 5:
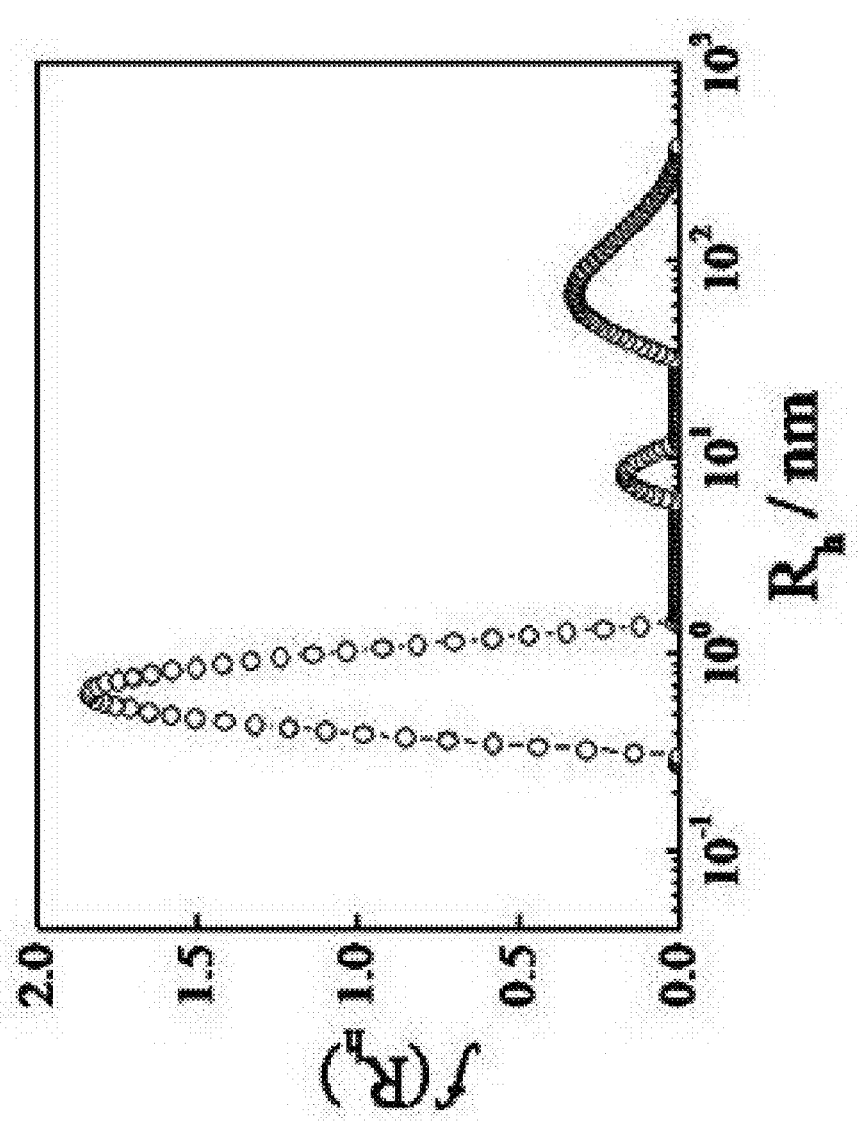
FIG. 5 is a plot of light scattering by the carbanions through a dynamic light scattering, in accordance with some embodiments.

FIG. 5 is a plot of light scattering by the carbanions through a dynamic light scattering, in accordance with some embodiments. Further, the dynamic light scattering may be a technique for measuring a particle size. Further, the particle size range from a few nanometers (nm) to a few microns. Further, the light intensity may be proportional to the size of "aggregates". Further, the dynamic light scattering may be an excellent tool for translocation. Further, 0.6 nm peaks may show greater intensity-weight distribution. Further, large aggregates scatter the storing light for 0.6 nm peak. Further, most micelles may be 0.6 nm in particle size hydrodynamic radius.

Figure 6:
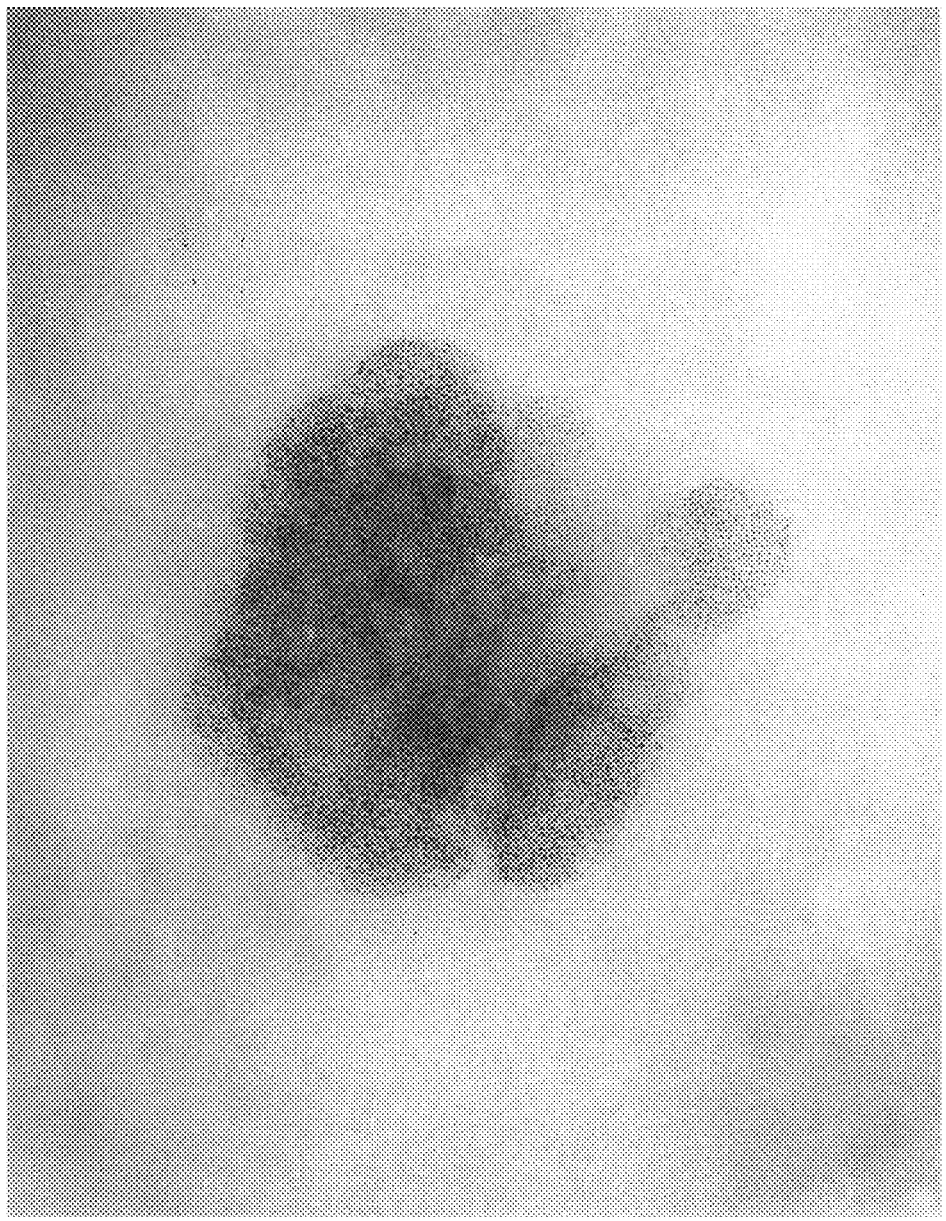
FIG. 6 is a magnified view of a sample of a solution of the agricultural composition, in accordance with some embodiments.

FIG. 6 is a magnified view of a sample of a solution of the agricultural composition, in accordance with some embodiments. Further, the solution may include a 1:1 dilution. Further, the sample of the solution may be magnified up to 100,000×. Further, the sample of the solution may include droplets with small grains. Further, the droplets may include the carbanions.

Figure 7:
FIG. 7 is a magnified view of a sample of the solution, in accordance with some embodiments.

FIG. 7 is a magnified view of a sample of the solution, in accordance with some embodiments. Further, the solution may include a 1:1 dilution. Further, the sample of the solution may be magnified up to 100,000×. Further, the sample of the solution may include droplets with small grains. Further, the droplets may include the carbanions.

Figure 8:
FIG. 8 is a magnified view of a sample of a solution of the agricultural composition, in accordance with some embodiments.

FIG. 8 is a magnified view of a sample of a solution of the agricultural composition, in accordance with some embodiments. Further, the solution may include a 1:100 dilution. Further, the sample of the solution may be magnified up to 100,000×. Further, the sample of the solution may include droplets with small grains. Further, the droplets may include the carbanions.

Figure 9:
FIG. 9 is a magnified view of a sample of the solution, in accordance with some embodiments.

FIG. 9 is a magnified view of a sample of the solution, in accordance with some embodiments. Further, the solution may include a 1:100 dilution. Further, the sample of the solution may be magnified up to 100,000×. Further, the sample of the solution may include droplets with small grains. Further, the droplets may include the carbanions.

Figure 10:
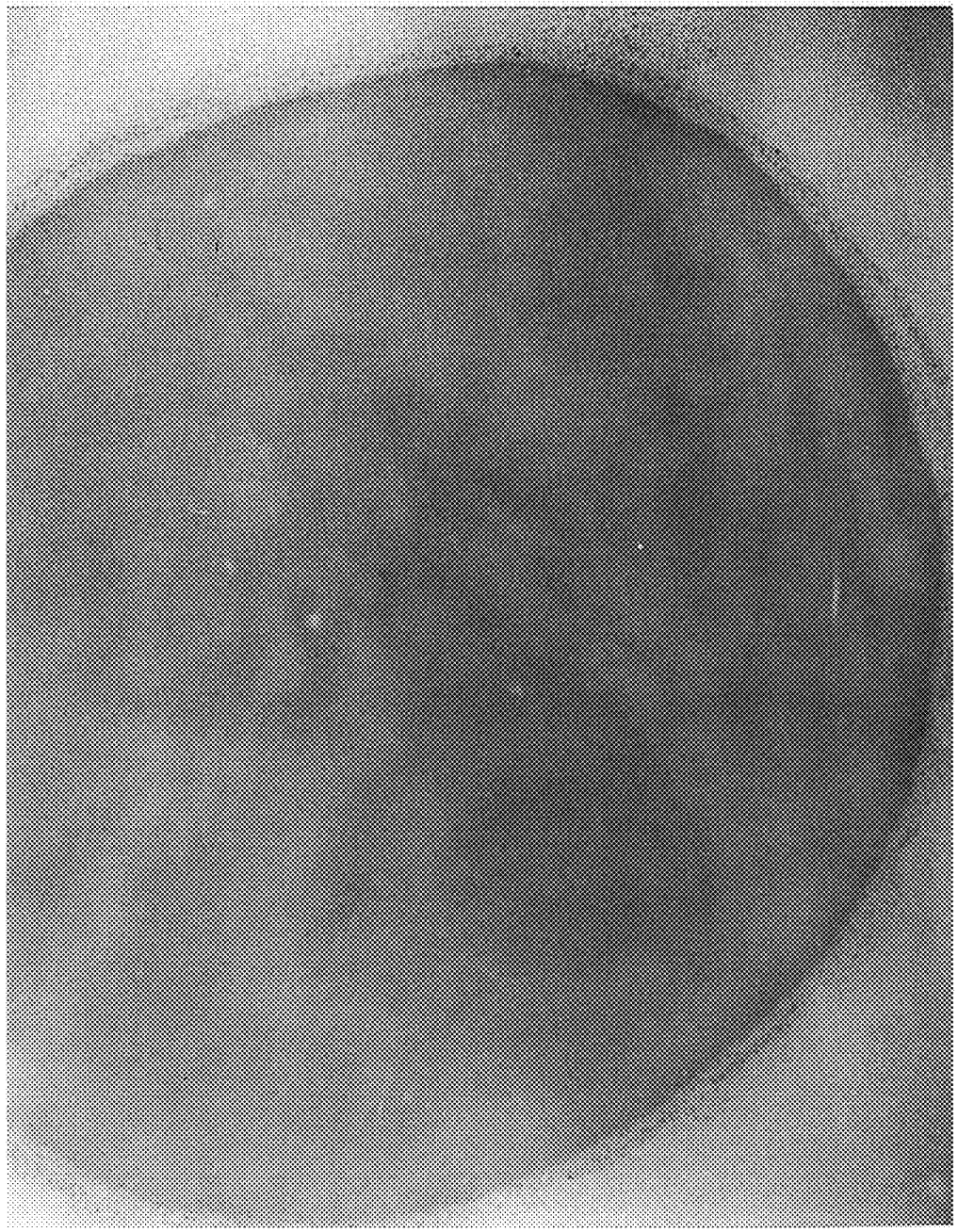
FIG. 10 is a magnified view of a sample of a solution of the agricultural composition, in accordance with some embodiments.

FIG. 10 is a magnified view of a sample of a solution of the agricultural composition, in accordance with some embodiments. Further, the solution may include a straight solution. Further, the solution may be magnified up to 100,000×. Further, the sample of the solution may include droplets. Further, the droplets may include similar size particles around the edges, but inside, the grain is less than 1 nm (nanometer). Further, the droplets may include the carbanions.

Figure 11:
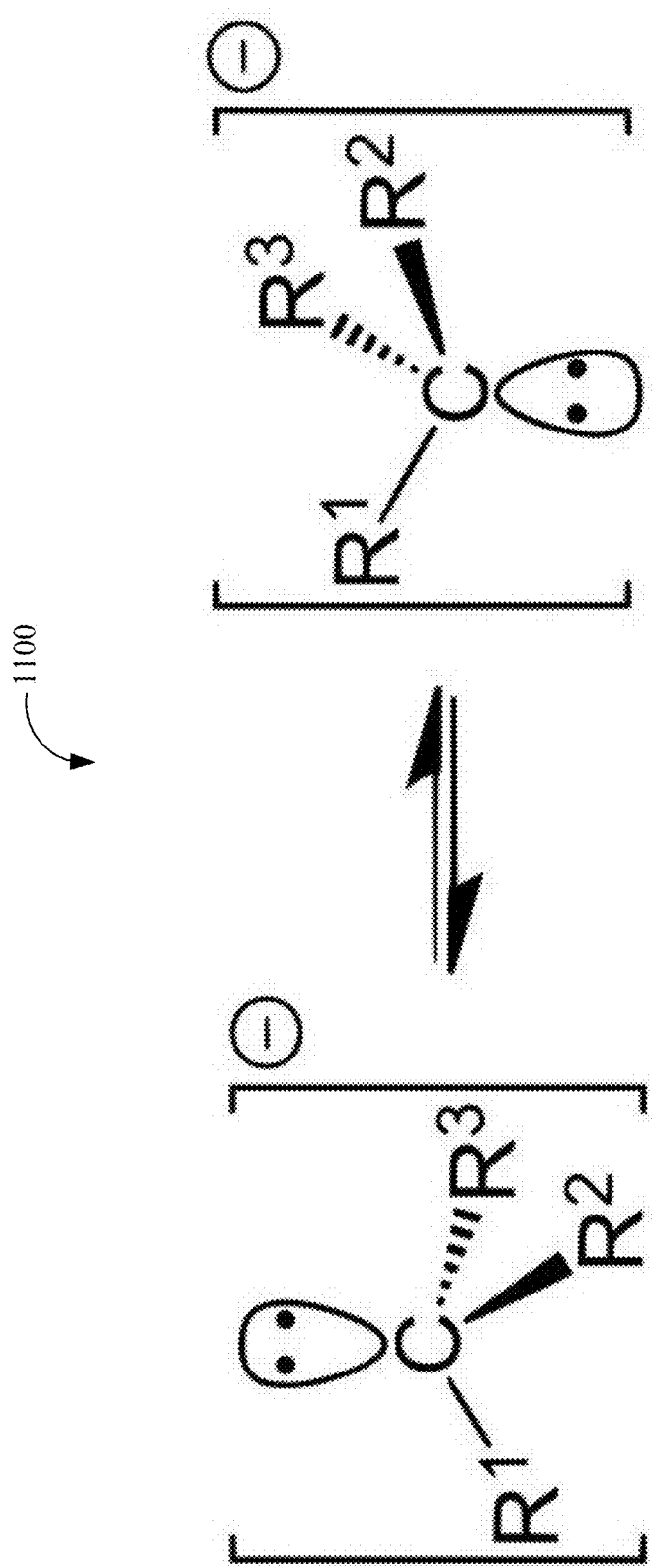
FIG. 11 is a schematic of a carbanion of the carbanions, in accordance with some embodiments.

FIG. 11 is a schematic of a carbanion 1100 of the carbanions, in accordance with some embodiments. Further, the carbanion 1100 is an anion in which carbon bears a formal negative charge. Further, the carbanion 1100 may include eight electrons in the valence shell of the carbon. Further, a carbon-atom of the carbanion 1100 may include a negative charge. Further, the valence shell of a negatively charged carbon-atom may include 8-electrons. Further, the octet of the negatively charged carbon atom may be complete. Further, the negatively charged carbon atom may include an extra pair of electrons. Further, the negatively charged carbon may be in a state of sp3 hybridization. Further, the hybrid orbitals may be directed towards the corners of a tetrahedron. Further, three of the hybrid orbitals may be involved in the formation of single covalent bonds with other atoms while the fourth hybrid orbital may include a lone pair of electron. Further, the carbanion 1100 may include a pyramidal structure similar to NH3 molecule. Further, the carbon-atom may include eight electrons even the carbon-atom may be a highly reactive intermediate. Further, the carbon-atom may be readily attacked by electrophilic reagents. Further, the carbanion 1100 may be a nucleophile.

Although the present disclosure has been explained in relation to its preferred embodiment, it is to be understood that many other possible modifications and variations can be made without departing from the spirit and scope of the disclosure.

What is claimed is:

1. An agricultural composition for facilitating treatment of a plant, wherein the agricultural composition comprising:
   carbanions, wherein a carbanion of the carbanions comprises a carbon atom, wherein the carbon atom comprises a formal charge of −1; and
   a diluting agent, wherein the diluting agent is capable of dissolving the carbanions for forming a solution, wherein the dissolving of the carbanions comprises diluting the carbanions, wherein a ratio of the diluting agent to the carbanions by volume ranges from 50:1 to 550:1, wherein the dissolving facilitates at least one application of the solution to the plant.

2. The agricultural composition of claim 1, wherein the ratio of the diluting agent to the carbanions by the volume is 375:1.

3. The agricultural composition of claim 1, wherein the ratio of the diluting agent to the carbanions by the volume is 533:1.

4. The agricultural composition of claim 1, wherein the ratio of the diluting agent to the carbanions by the volume is 320:1.

5. The agricultural composition of claim 1, wherein the ratio of the diluting agent to the carbanions by the volume is 400:1.

6. The agricultural composition of claim 1, wherein the carbanions are derived from at least one organic material, wherein the at least one organic material is associated with at least one plant.

7. The agricultural composition of claim 1, wherein the carbon atom is associated with a hybridization state, wherein the hybridization state is sp3 hybridization state, wherein the carbon atom in the sp3 hybridization state is trivalent, wherein the carbon atom in the sp3 hybridization state comprises a lone pair of electrons on the carbon atom.

8. The agricultural composition of claim 1, wherein the solution comprises a dispersing agent capable of dispersing the carbanions in the diluting agent, wherein the carbanions are present in the solution in a form of granules, wherein a size of a granule of the granules is 340 pm (picometer).

9. The agricultural composition of claim 1 further comprising a chelating agent capable of chelating at least one nutrient associated with the plant, wherein the solution is capable of mobilizing the at least one nutrient from the chelating agent to the plant based on the at least one application of the solution to the plant.

10. The agricultural composition of claim 1, wherein the solution comprises a surface tension reducing agent capable of reducing a surface tension of water associated with the plant, wherein the solution is capable of enhancing an internal translocation of at least one nutrient associated with the plant through at least one of a xylem system and a phloem system of the plant based on the reducing.

11. The agricultural composition of claim 1, wherein the solution comprises a solvent agent capable of softening a surface of at least one part of the plant based on the at least one application of the solution to the plant, wherein at least one nutrient enters into at least one circulation pathway of the plant through the surface of the at least one part of the plant based on the softening.

12. The agricultural composition of claim 1, wherein each carbanion of the carbanions is capable of creating an electromechanical reaction with an organic material of at least one organism present on the plant based on the at least one application of the solution, wherein the creating of the electromechanical reaction disassembles the organic material for eliminating the at least one organism.

13. The agricultural composition of claim 1, wherein the at least one application of the solution comprises dispensing the solution in soil associated with the plant, wherein the carbanions are cable of increasing an electrical conductivity of the soil based on the dispensing, wherein at least one nutrient transfers from the soil to the plant based on the increasing of the electrical conductivity.

14. A method for producing an agricultural composition to facilitate treatment of a plant, the method comprising:
   extracting at least one organic material from at least one organic material source, wherein the at least one organic material comprises a carbon compound;
   blending the at least one organic material with at least one reagent for forming an agricultural composition preform;
   applying at least one of a specific temperature and a specific pressure to the agricultural composition preform, wherein the applying initiates a chemical reaction in the agricultural composition preform, wherein the chemical reaction comprises at least one of a redox reaction and a reduction reaction, wherein the carbon compound is reduced to form carbanions based on the at least one of the redox reaction and the reduction reaction, wherein a carbon atom of a carbanion of the carbanions comprises a formal charge of −1; and dissolving the carbanions using a diluting agent for forming a solution, wherein the dissolving of the carbanions comprises diluting the carbanions, wherein a ratio of the diluting agent to the carbanions by volume ranges from 50:1 to 550:1, wherein the dissolving facilitates at least one application of the solution to the plant.

15. The method of claim 14, wherein the at least one of the redox reaction and the reduction reaction adds a pair of electrons to a carbon atom of the carbon compound for producing the carbanion, wherein the carbon atom is associated with sp3 hybridization state, wherein the carbon atom in the sp3 hybridization state is trivalent, wherein the carbon atom in the sp3 hybridization state comprises a lone pair of electrons on the carbon atom.

16. The method of claim 14, wherein the solution comprises a dispersing agent, wherein the dispersing agent is capable of dispersing the carbanions in the diluting agent, wherein the carbanions are present in the solution in a form of granules, wherein a size of a granule of the granules is 340 pm (picometer).

17. The method of claim 14 further comprising adding a chelating agent to the solution, wherein the chelating agent is capable of chelating at least one nutrient associated with the plant, wherein the solution is capable of mobilizing the at least one nutrient from the chelating agent to the plant based on the at least one application of the solution to the plant.

18. The method of claim 14, wherein the solution comprises a surface tension reducing agent, wherein the surface tension reducing agent is capable of reducing a surface tension of water associated with the plant, wherein the solution is capable of enhancing an internal translocation of at least one nutrient associated with the plant through at least one of a xylem system and a phloem system of the plant based on the reducing.

19. The method of claim 14, wherein the solution comprises a solvent agent, wherein the solvent agent is capable of softening a surface of at least one part of the plant based on the at least one application of the solution to the plant, wherein at least one nutrient enters into at least one circulation pathway of the plant through the surface of the at least one part of the plant based on the softening.

20. The method of claim 14, wherein each carbanion of the carbanions is capable of creating an electromechanical reaction with an organic material of at least one organism present on the plant based on the at least one application of the solution, wherein the creating of the electromechanical reaction disassembles the organic material for eliminating the at least one organism.

* * * * *